United States Patent
Keohane et al.

(10) Patent No.: US 7,475,360 B2
(45) Date of Patent: Jan. 6, 2009

(54) METHOD FOR DYNAMICALLY PROVIDING SCROLL INDICATORS

(75) Inventors: Susann M. Keohane, Austin, TX (US);
Gerald F. McBrearty, Austin, TX (US);
Shawn P. Mullen, Buda, TX (US);
Jessica Murillo, Round Rock, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/201,650

(22) Filed: Aug. 11, 2005

(65) Prior Publication Data

US 2007/0038953 A1 Feb. 15, 2007

(51) Int. Cl.
*G06F 3/048* (2006.01)
(52) U.S. Cl. .................. 715/786; 715/784; 715/785
(58) Field of Classification Search ................. 715/784, 715/785; 345/684
See application file for complete search history.

(56) References Cited

U.S. PATENT DOCUMENTS

| | | | | |
|---|---|---|---|---|
| 5,550,969 A | * | 8/1996 | Torres et al. ................. 715/787 |
| 6,256,009 B1 | * | 7/2001 | Lui et al. ..................... 345/684 |
| 6,384,845 B1 | * | 5/2002 | Takaike ....................... 715/786 |
| 6,476,831 B1 | * | 11/2002 | Wirth et al. ................. 715/784 |
| 6,590,595 B1 | * | 7/2003 | Wagner et al. .............. 715/784 |
| 6,714,221 B1 | * | 3/2004 | Christie et al. ............. 715/784 |
| 6,750,886 B1 | | 6/2004 | Bergstedt |
| 6,778,192 B2 | * | 8/2004 | Arbab et al. ................ 715/786 |
| 6,803,930 B1 | * | 10/2004 | Simonson ................... 715/784 |
| 2002/0145631 A1 | * | 10/2002 | Arbab et al. ................ 345/786 |
| 2002/0186251 A1 | * | 12/2002 | Himmel et al. ............. 345/784 |
| 2003/0112269 A1 | * | 6/2003 | Lentz et al. ................. 345/738 |
| 2005/0091604 A1 | * | 4/2005 | Davis .......................... 715/772 |

* cited by examiner

*Primary Examiner*—Ba Huynh
*Assistant Examiner*—Kim-Lynn Dam
(74) *Attorney, Agent, or Firm*—Duke W. Yee; Matthew W. Baca; Peter B. Manzo (57) ABSTRACT

A method, system, and computer program product for visually indicating the last line(s) of text on a page displayed in a window so that the user can see this visual indication as they are scrolling the text. The user also has the ability to specify a hard stop for the scrolling once the visual indication has reached a desired position.

1 Claim, 7 Drawing Sheets

METHOD FOR DYNAMICALLY PROVIDING SCROLL INDICATORS

BACKGROUND

1. Technical Field of the Present Invention

The present invention generally relates to application software, and more specifically, to methods, systems, and computer program products that allow the user to view information in a window type environment.

2. Description of Related Art

The term computer is no longer simply being associated with a bulky device that is limited to being used with a desk and chair. In fact, current usage of the term applies to any electronic device capable of displaying information to a user. The term has been redefined by the consumer and their insatiable appetite for the availability of information anywhere and any time. Consequently, a number of mobile devices (e.g. cell phones, pagers, and the like) have arisen to fill this hunger.

The individual user of these devices (both large (e.g. desktop) and small (cell phone) is often simultaneously performing multiple tasks with any number of other devices or people. The design of these devices must take into account that a user can and typically will only has a single hand free at any moment in time to operate the particular device.

To accomplish this task, most computers have incorporated a mouse type device that provides the user with the ability to use a single hand to display information. The mouse is designed so as to limit the amount of movement required by the single hand, and typically, includes multiple buttons so as to limit the interactions required from a keyboard (e.g. scroll wheels and pull sticks).

The effectiveness of the mouse device is most notable with a window type environment such as Windows XP. In such an environment, information is displayed and gathered in windows that can be of various sizes depending upon the display space, application, or particular desires of the user. Information that exceeds the physical size of the window is displayed using scroll bars to assist in the viewing. The scroll bars indicate the relative length of the document and the current position within the document.

The typical control device (mouse) includes a scroll function (e.g. scroll wheel) that provides the user with the ability to move the information within the window a predetermined distance (e.g. one text line) upon each turn or movement of the scroll wheel. Although the scroll wheel and its related functionality are helpful, they are less than adequate when attempting to read text.

This results from the fact that the reading pattern of the average user and the functionality of the scroll wheel do not match one another. Specifically, the average user does not read one line of text, scroll to the next line, and continue this pattern until they have completed reading the displayed information. Typically, the user reads the information contained within a displayed page from top to bottom, and upon reaching the bottom they attempt to scroll the window via the scroll wheel until the last line of previously read text is located at the top of the page.

Unfortunately, the movement of the text by the scroll wheel often results in the user overshooting the desired position of the line of previously read text (i.e. top of the page). In order to adjust or figure out where the last line of previously read text is now located, the user will scroll backwards and forwards until the page is positioned appropriately.

It would, therefore, be a distinct advantage to provide the user with a visual indication of the last line of text on an initially displayed page even while that page is being is scrolled. It would be further advantageous if the user had the option to automatically stop the scrolling of the text upon reaching a predetermined location.

SUMMARY OF THE PRESENT INVENTION

In one aspect, the present invention is a method of scrolling information displayed within a window, the method includes the step of determining that a user is viewing the displayed information. The method also includes the step of selecting one or more of the lines of displayed information as a scrolling endpoint. The method further includes the step of automatically stopping the scrolling of the information when the scrolling endpoint is reached.

BRIEF DESCRIPTION OF THE DRAWINGS

The present invention will be better understood and its numerous advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method, system, and computer program product for automatically providing the user with a visual indication of the last line of text within an initially displayed page even while the user is scrolling. Alternatively, the present invention provides the user with the ability to automatically stop the scrolling of the text upon reaching a predetermined point or the last line of text within an initially displayed page.

Figure 1:
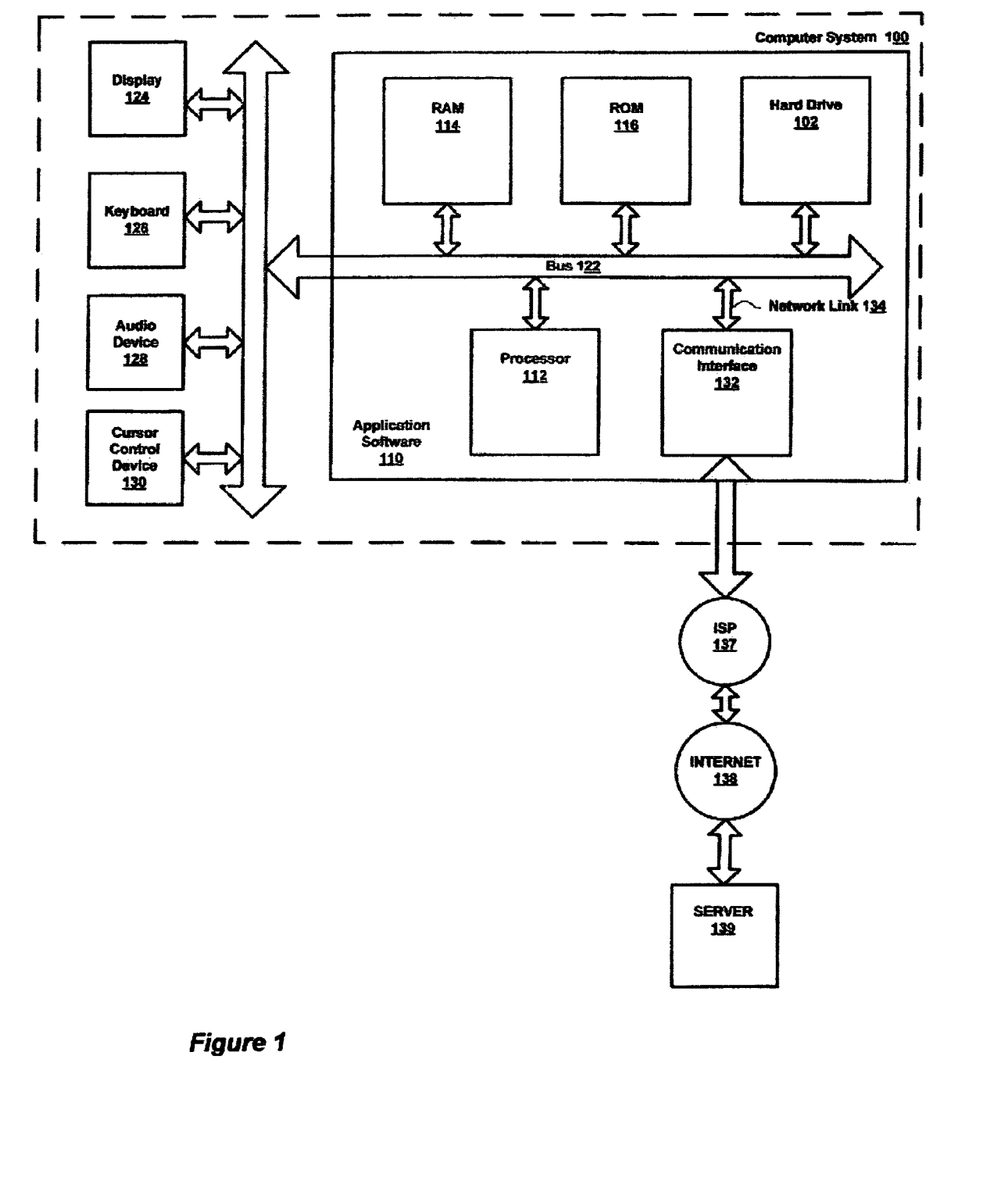
FIG. 1 is a block diagram illustrating a computer system that implements a preferred embodiment of the present invention.

Reference now being made to FIG. 1, a block diagram is shown illustrating a computer system 100 that implements a preferred embodiment of the present invention. Computer System 100 includes various components each of which are explained in greater detail below.

Bus 122 represents any type of device capable of providing communication of information within Computer System 100 (e.g., System bus, PCI bus, cross-bar switch, etc.)

Processor 112 can be a general-purpose processor (e.g., the PowerPC™ manufactured by IBM or the Pentium™ manufactured by Intel) that, during normal operation, processes data under the control of an operating system and application software 110 stored in a dynamic storage device such as Random Access Memory (RAM) 114 and a static storage device such as Read Only Memory (ROM) 116. The operating system preferably provides a graphical user interface (GUI) to the user.

The present invention, including the alternative preferred embodiments, can be provided as a computer program product, included on a machine-readable medium having stored on it machine executable instructions used to program computer system 100 to perform a process according to the teachings of the present invention.

The term "machine-readable medium" as used in the specification includes any medium that participates in providing instructions to processor 112 or other components of computer system 100 for execution. Such a medium can take many forms including, but not limited to, non-volatile media, and transmission media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or rewriteable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the preferred embodiment, an example of a non-volatile medium is the Hard Drive 102.

Volatile media includes dynamic memory such as RAM 114. Transmission media includes coaxial cables, copper wire or fiber optics, including the wires that comprise the bus 122. Transmission media can also take the form of acoustic or light waves, such as those generated during radio wave or infrared data communications.

Moreover, the present invention can be downloaded as a computer program product where the program instructions can be transferred from a remote computer such as server 139 to requesting computer system 100 by way of data signals embodied in a carrier wave or other propagation medium via network link 134 (e.g., a modem or network connection) to a communications interface 132 coupled to bus 122.

Communications interface 132 provides a two-way data communications coupling to network link 134 that can be connected, for example, to a Local Area Network (LAN), Wide Area Network (WAN), or as shown, directly to an Internet Service Provider (ISP) 137. In particular, network link 134 may provide wired and/or wireless network communications to one or more networks.

ISP 137 in turn provides data communication services through the Internet 138 or other network. Internet 138 may refer to the worldwide collection of networks and gateways that use a particular protocol, such as Transmission Control Protocol (TCP) and Internet Protocol (IP), to communicate with one another. ISP 137 and Internet 138 both use electrical, electromagnetic, or optical signals that carry digital or analog data streams. The signals through the various networks and the signals on network link 134 and through communication interface 132, which carry the digital or analog data to and from computer system 100, are exemplary forms of carrier waves transporting the information.

In addition, multiple peripheral components can be added to computer system 100. For example, audio device 128 is attached to bus 122 for controlling audio output. A display 124 is also attached to bus 122 for providing visual, tactile or other graphical representation formats. Display 124 can include both non-transparent surfaces, such as monitors, and transparent surfaces, such as headset sunglasses or vehicle windshield displays.

A keyboard 126 and cursor control device 130, such as mouse, trackball, or cursor direction keys, are coupled to bus 122 as interfaces for user inputs to computer system 100.

The execution of application software 110 on computer system 100 according to a preferred embodiment of the present invention is explained in greater detail below.

Figure 2:
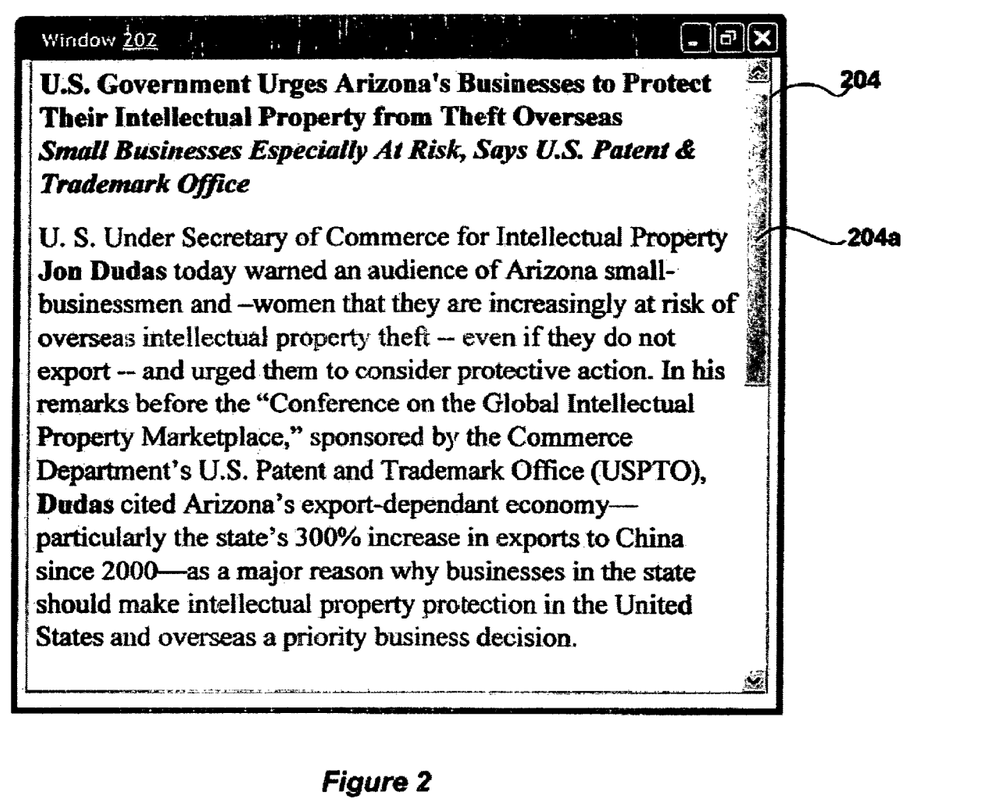
FIG. 2 is a diagram illustrating an example of a graphical representation of a window generated during the execution of the application software of FIG. 1 according to the teachings of a preferred embodiment of the present invention.

Reference now being made to FIG. 2, a diagram is shown illustrating an example of a graphical representation of a window 202 generated during the execution of the application software 110 of FIG. 1 according to the teachings of a preferred embodiment of the present invention. Application software 110 can be any type of software that generates a graphical representation for providing information to a user in a human readable format (e.g. word processor, web browser, notepad, and the like).

In the present example, the window 202 is representative of a window type environment such as Windows 2000™ or XPT™. This environment, however, is not intended to be a limitation on the types of graphical representations to which the present invention is applicable, but rather, as a convenient and familiar interface from which to provide an explanation of the present invention.

In the present example, the window 202 is being used to display text from the U.S. Patent and Trademark Office website (e.g. functioning as a type of browser). Window 202 includes a vertical scroll bar 204 having a thumb 204a for indicating the length of the document and relative location being displayed. The method of the present invention is explained in connection with FIG. 3 below in the context of the window 202 from FIG. 2.

Figure 3:
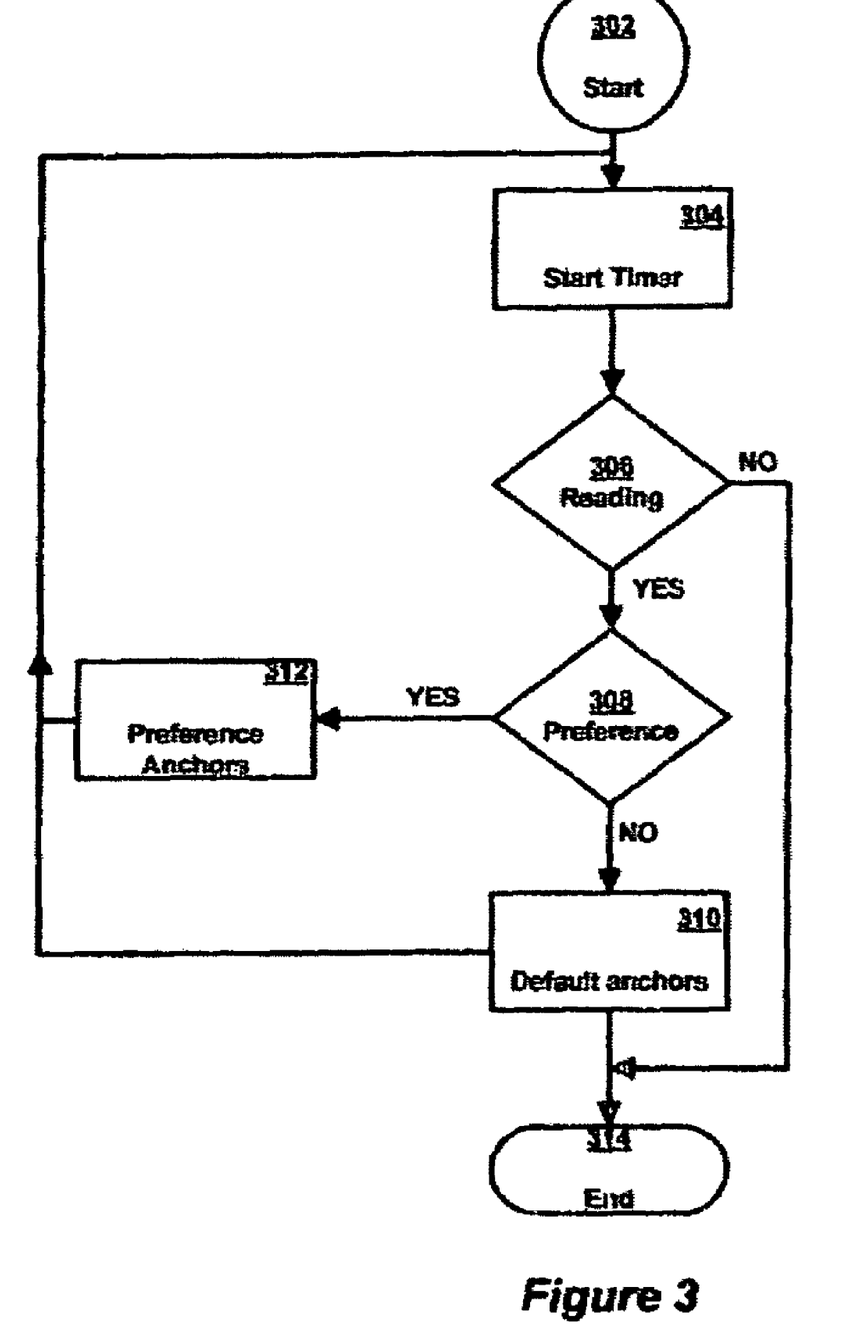
FIG. 3 is a flow chart illustrating the method for displaying soft anchor points in the window of FIG. 2 according to the teachings of a preferred embodiment of the present invention.

Reference now being made to FIG. 3, a flow chart is shown illustrating the method for displaying soft anchor points in the window 202 of FIG. 2 according to the teachings of a preferred embodiment of the present invention. The method of the present invention is activated anytime the user opens a window 202 that has the ability to vertically scroll (Step 302).

Anchors (hard and/or soft) are activated, unless otherwise specified by the user, anytime it is determined that the user is reading the displayed information. The determination of when a user is reading the information displayed by window 202 is designer specific, and therefore, the explanation provided below is not intended to be a limitation, but rather, an example of a preferred embodiment for making this determination. In the preferred embodiment of the present invention, a timer is used in combination with a determination that the display of the information has not changed as a result of any action by the user as explained below.

The method continues by initiating a timer (Step 304) with a user specified or default value. In general, the length of the timer should be as close as possible to the typical time associated with an indication that a user has began to read the information displayed by window 202.

If the user has not taken any action that results in changing how the information is displayed by window 202 (e.g. using the scroll bar, mouse, causing the window to become inactive, and the like), and the timer has expired, then the method proceeds under the assumption that the user is reading the displayed information (Step 306).

The method continues by determining whether the user has indicated a preference for anchors (Step 308). In the preferred embodiment of the present invention, the user can specify whether soft anchors or hard anchors are to be used when text is displayed. Soft and hard anchors are explained in connection with FIGS. 4 and 5 below.

If the user has specified a preference, then the method implements that preference (Step 312). If, however, the user has not specified a preference, then a default anchor (e.g. hard anchor) is applied (Step 310).

After the anchors have been applied and the user has finished scrolling, the method proceeds to restart the timer (Step 304) and repeat the method from that point.

Figure 4:
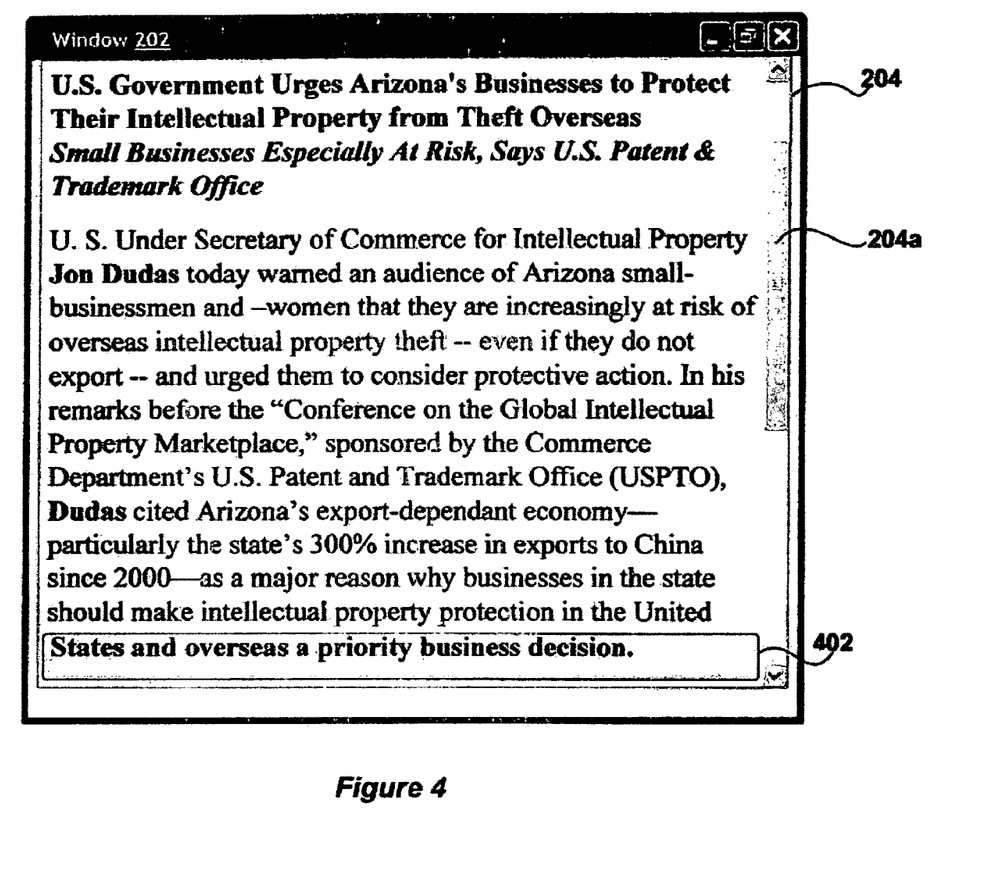
FIGS. 4 and 5 are diagrams illustrating the window of FIG. 2 with a soft anchor implemented according to the teachings of a preferred embodiment of the present invention.

Reference now being made to FIG. 4, a diagram is shown illustrating the window 202 of FIG. 2 with a soft anchor 402 implemented according to the teachings of a preferred embodiment of the present invention. As previously described in connection with FIG. 3, it has been determined that the user is currently reading the text displayed within window 202, and that either the user preference is for soft anchors or they are the default.

A soft anchor is any visual indication intended to inform the user of the last line, or a user specified number of lines, of text (this can either be the very top or bottom line of the currently displayed text depending upon the direction the user is currently traversing). In this example, it is assumed that the user is reading the text from top to bottom and the last line of text has been identified, for example, by displaying this text in an inverted format via soft anchor 402.

Figure 5:
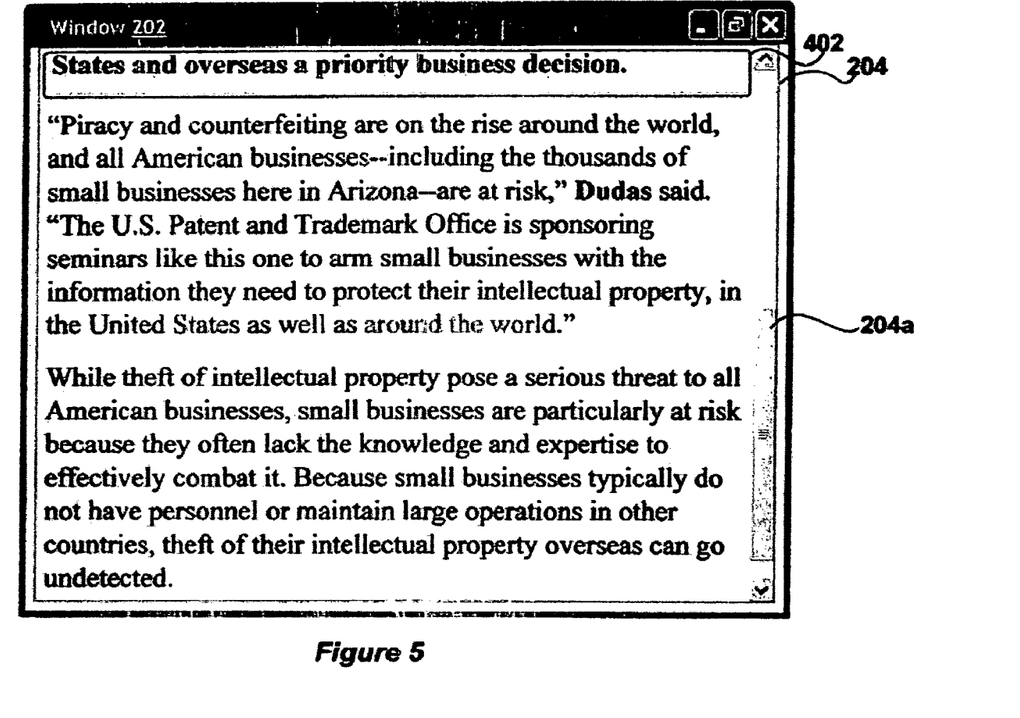

As the user employs the scroll wheel, the soft anchor 402 moves until the user has moved the text within the window a desired distance. In this particular example, the user has moved the text until the soft anchor is now positioned at the top of the window 202 as illustrated in FIG. 5. An example of the use of hard anchors is explained in connection with FIG. 6.

Figure 6:
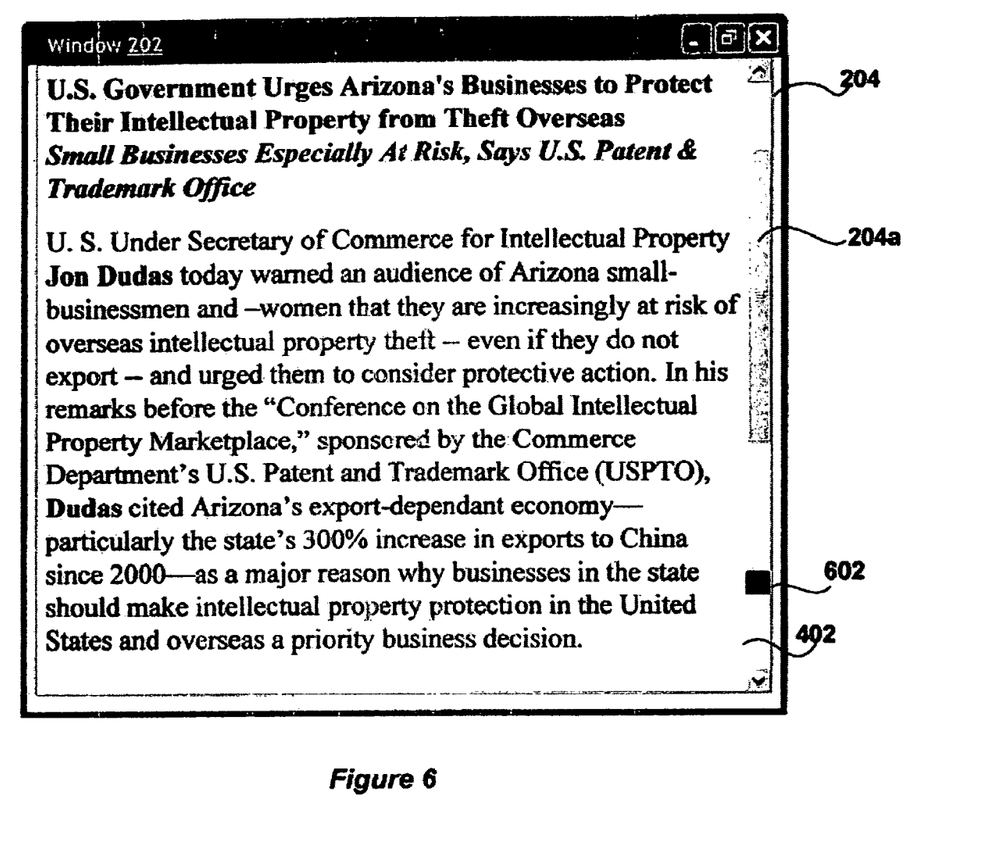
FIGS. 6 and 7 are a diagrams illustrating the window of FIG. 2 with a hard anchor implemented according to the teachings of a preferred embodiment of the present invention.
Figure 7:
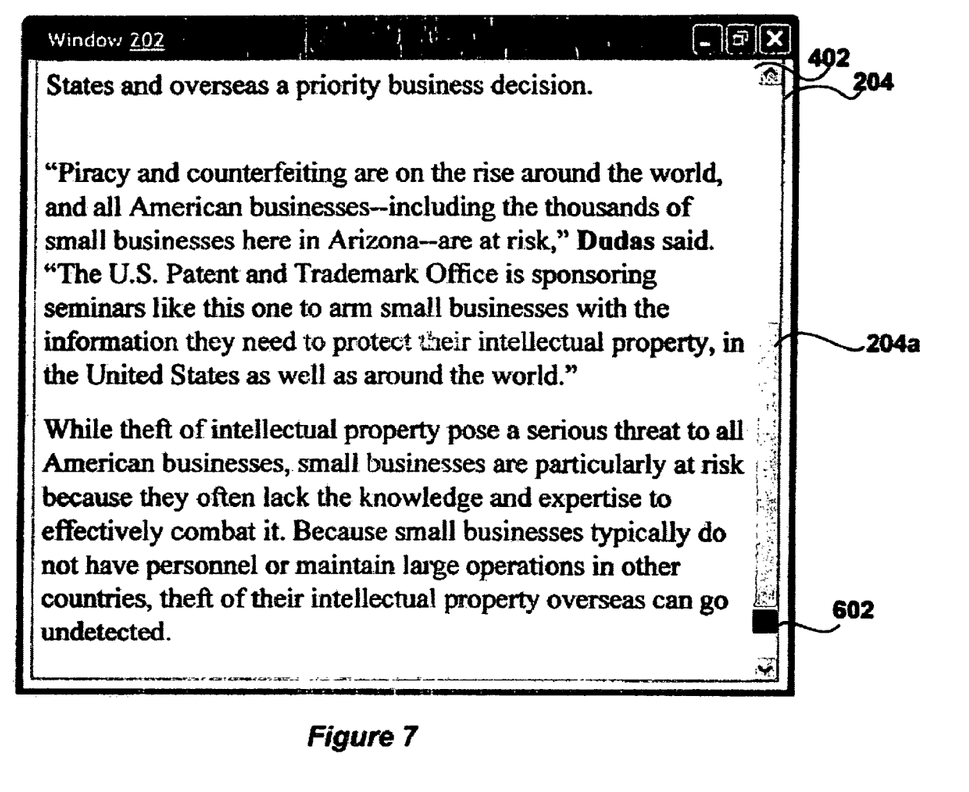

Reference now being made to FIG. 6, a diagram is shown illustrating the window 202 of FIG. 2 with a hard anchor implemented according to the teachings of a preferred embodiment of the present invention. Hard anchors provide both a visual indication of where the last line, or a user specified number of lines, of currently displayed text should reside and a physical stopping point for scrolling. In the preferred embodiment of the present invention, a hard anchor 602 is illustrated on the scroll bar 204 that will stop the scrolling by the user once the last line of text has reached the desired position. In the present example, the preferred position is the top of the page as illustrated in FIG. 7.

In the preferred embodiment of the present invention, the user is provided with system preferences that can dictate the disposition of anchors (hard and soft). One preference allows the anchor points to remain throughout the text viewing session. Another preference allows the anchor points to dissolve or disappear once the current window being displayed scrolls past the text that defined the anchor points It is thus believed that the operation and construction of the present invention will be apparent from the foregoing description. While the method, system, and computer program product shown and described has been characterized as being preferred, it will be readily apparent that various changes and/or modifications could be made without departing from the spirit and scope of the present invention as defined in the following claims.

What is claimed is:

1. A method of scrolling information displayed within a window, the method comprising the steps of:

selecting by a user soft anchor points or hard anchor points to be created within a window that includes a scroll bar, wherein a soft anchor point is a visual indication within displayed information where one or more selected lines of the displayed information reside within the window and is not a physical stopping or pausing point for user scrolling, and wherein a hard anchor point is a visual indication within the scroll bar where the one or more selected lines of the displayed information reside within the window and is a physical stopping point within the scroll bar for the user scrolling;

activating creation of the soft anchor points or the hard anchor points automatically when the user opens the window that includes the scroll bar;

initiating a timer, wherein the length of the timer is user definable;

determining whether the timer has expired;

determining whether the user is viewing the displayed information within the window by detecting that the user has spent a predetermined amount of time without moving the displayed information, wherein the predetermined amount of time is user definable;

responsive to determining that the timer has expired and that the user is viewing the displayed information within the window, determining whether the user selected the soft anchor points or the hard anchor points to be created within the window;

selecting one or more lines of the displayed information as a scrolling endpoint, wherein the one or more selected lines of the displayed information are located at the bottom of the window;

responsive to determining that the user selected the hard anchor points to be created within the window after determining that the timer expired and the user is viewing the displayed information, creating the hard anchor point for the scrolling end point within the scroll bar for the one or more selected lines of the displayed information;

stopping the user scrolling of the displayed information automatically when the hard anchor point within the scroll bar is reached;

dissolving the hard anchor point automatically after the user scrolling is stopped when the hard anchor point within the scroll bar is reached; and detecting that the user is scrolling the displayed information within the window.

* * * * *